United States Patent
Kim

(10) Patent No.: US 11,133,517 B2
(45) Date of Patent: Sep. 28, 2021

(54) SYSTEM AND METHOD FOR MAINTAINING INSULATION RESISTANCE OF FUEL CELL

(71) Applicants: Hyundai Motor Company, Seoul (KR); Kia Motors Corporation, Seoul (KR)

(72) Inventor: Hyun Hie Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 277 days.

(21) Appl. No.: 16/195,034

(22) Filed: Nov. 19, 2018

(65) Prior Publication Data
US 2020/0075977 A1 Mar. 5, 2020

(30) Foreign Application Priority Data
Sep. 4, 2018 (KR) .................. 10-2018-0105274

(51) Int. Cl.
| | |
|---|---|
| *H01M 8/04791* | (2016.01) |
| *H01M 8/04029* | (2016.01) |
| *H01M 8/04746* | (2016.01) |
| *H01M 8/04007* | (2016.01) |
| *H01M 8/04537* | (2016.01) |
| *H01M 8/04701* | (2016.01) |

(52) U.S. Cl.
CPC ... *H01M 8/04813* (2013.01); *H01M 8/04029* (2013.01); *H01M 8/04074* (2013.01); *H01M 8/04649* (2013.01); *H01M 8/04731* (2013.01); *H01M 8/04768* (2013.01)

(58) Field of Classification Search
CPC ......... H01M 8/04813; H01M 8/04029; H01M 8/04074; H01M 8/04649; H01M 8/04731; H01M 8/04768
See application file for complete search history.

(56) References Cited

U.S. PATENT DOCUMENTS

2013/0034786 A1* 2/2013 Matsumoto ....... H01M 8/04089
429/429

FOREIGN PATENT DOCUMENTS

KR 10-1673345 B1 11/2016

* cited by examiner

*Primary Examiner* — Jane J Rhee
(74) *Attorney, Agent, or Firm* — Mintz Levin Cohn Ferris Glovsky and Popeo, P.C.; Peter F. Corless

(57) ABSTRACT

A system for maintaining insulation resistance of a fuel cell includes a fuel cell stack, a coolant line that allows coolant to pass through the fuel cell stack, a circulation pump that circulates the coolant in the coolant line, a deionizer that removes impurities or ions from the coolant in the coolant line, and a controller configured to measure the insulation resistance of a high-voltage terminal connected to the fuel cell stack, to determine whether recovery control is necessary based on the measured insulation resistance, and upon determining that recovery control is necessary, to control the circulation pump so as to change the flow of the coolant passing through the deionizer.

6 Claims, 3 Drawing Sheets

SYSTEM AND METHOD FOR MAINTAINING INSULATION RESISTANCE OF FUEL CELL

CROSS-REFERENCE TO RELATED APPLICATION(S)

This application claims under 35 U.S.C. § 119(a) the benefit of Korean Patent Application No. 10-2018-0105274, filed on Sep. 4, 2018 in the Korean Intellectual Property Office, the entire contents of which are incorporated herein by reference.

BACKGROUND

1. Technical Field

The present disclosure relates to a system and method for maintaining an insulation resistance of a fuel cell, more particularly, to a system and method of preventing a reduction in the insulation resistance of the fuel cell attributable to contamination of coolant for cooling a fuel cell stack.

2. Description of the Related Art

A fuel cell is a type of power generation device that directly converts chemical energy, generated by oxidation of fuel, into electric energy. Like a chemical cell, a fuel cell incorporates oxidation and reduction reactions. However, unlike a chemical cell, which is configured such that a cell reaction occurs in a closed system, a fuel cell is configured such that reactants are continuously supplied from the outside and a reaction product is continuously removed from the system to the outside. In recent years, a fuel cell power generation system has been commercialized. Since the reaction product of a fuel cell is pure water, studies on the use of fuel cells as energy sources for environmentally-friendly vehicles have been actively conducted.

In order to efficiently expend energy, a fuel cell vehicle utilizes a hybrid system that has a secondary energy storage device, such as a battery or a super capacitor, in addition to a fuel cell, which is a primary energy source. Here, a bi-directional converter serves to maintain a constant fuel utilization rate and to balance power between the fuel cell and a load by charging and discharging the appropriate amount of energy through an energy storage device such as a battery or the like.

It is important to keep the insulation resistance from decreasing in a vehicle operating by high voltage of a high-voltage battery or a fuel cell. Generally, a decrease in insulation resistance is mainly caused by malfunction of high-voltage parts such as, for example, internal short-circuit or dielectric breakdown of high-voltage parts, dielectric breakdown of high-voltage cables, etc.

However, in the case of a fuel cell vehicle, even when coolant flowing through a fuel cell stack is contaminated, current may flow through ions in the coolant, whereby the insulation resistance of a high-voltage terminal may decrease.

Therefore, it is essential to maintain the insulation resistance by removing impurities and ions present in the coolant that cools the fuel cell stack. In an actual fuel cell vehicle, a decrease in insulation resistance frequently occurs due to accumulation of impurities in the stack coolant attributable to long-term parking or due to contamination and ionization of the stack coolant attributable to leakage of impurities from a radiator, cooling lines and the stack due to unknown causes.

The information disclosed in this Background section is only for enhancement of understanding of the general background of the disclosure and should not be taken as an acknowledgement or any form of suggestion that this information forms the prior art already known to a person skilled in the art.

SUMMARY

Therefore, the present disclosure provides a system and method for maintaining insulation resistance of a fuel cell, in which the insulation resistance of a high-voltage terminal connected to a fuel cell stack is restored by increasing the flow rate of coolant passing through a deionizer. In accordance with an aspect of the present disclosure, the above and other objects can be accomplished by the provision of a system for maintaining insulation resistance of a fuel cell, the system including a fuel cell stack, a coolant line formed so as to allow coolant flowing therethrough to pass through the fuel cell stack, a circulation pump provided in the coolant line in order to circulate the coolant in the coolant line, a deionizer provided in the coolant line in order to remove impurities or ions from the coolant in the coolant line, and a controller configured to measure insulation resistance of a high-voltage terminal connected to the fuel cell stack, to determine whether recovery control is necessary based on the measured insulation resistance, and upon determining that recovery control is necessary, to control the circulation pump so as to change a flow of the coolant passing through the deionizer.

The system may further include a radiator located between the circulation pump and the fuel cell stack in the coolant line in order to cool the coolant in the coolant line, a bypass line diverging from a point of the coolant line before the coolant enters the radiator based on a flow direction of the coolant and merging with the coolant line while bypassing the radiator, and a control valve located at the point at which the bypass line diverges from the coolant line or a point at which the bypass line merges with the coolant line in order to control the flow of the coolant between the coolant line and the bypass line. The controller may control the control valve so as to change the flow of the coolant between the coolant line and the bypass line based on the temperature of the coolant or the temperature of the fuel cell stack.

The deionizer may be located in a filter line diverging from a point of the coolant line between the circulation pump and the fuel cell stack and merging with the control valve, and the control valve may be a 4-way valve connected with the coolant line, the bypass line and the filter line.

Upon determining that recovery control is necessary, the controller may control the control valve so as to increase the flow rate of the coolant in the filter line.

In accordance with another aspect of the present disclosure, there is provided a method of maintaining insulation resistance of a fuel cell, the method including measuring insulation resistance of a high-voltage terminal connected to a fuel cell stack, determining whether recovery control is necessary based on the measured insulation resistance, and upon determining that recovery control is necessary, changing the flow of coolant passing through a deionizer for removing impurities or ions from the coolant in a coolant line for cooling the fuel cell stack.

In changing the flow of the coolant, a circulation pump for circulating the coolant in the coolant line may be controlled at a predetermined number of revolutions per minute (RPM), and a control valve may be controlled so as to increase the flow rate of the coolant passing through the deionizer located in a filter line, which diverges from a point of the coolant line between the circulation pump and the fuel cell stack and merges with a point of the coolant line before the circulation pump via the control valve.

In measuring the insulation resistance of the high-voltage terminal, the insulation resistance of the high-voltage terminal may be measured at predetermined regular time intervals.

In determining whether recovery control is necessary, when the magnitude of the measured insulation resistance is equal to or less than a predetermined first resistance value, it may be determined that recovery control is necessary.

In changing the flow of the coolant, the change of the flow of the coolant may be maintained for a predetermined maintenance time period. The method may further include determining whether the magnitude of the insulation resistance measured after the predetermined maintenance time period is equal to or greater than a predetermined second resistance value that is greater than the first resistance value, and upon determining that the magnitude of the insulation resistance is equal to or greater than the second resistance value, terminating recovery control for changing the flow of the coolant.

The method may further include, after determining whether the magnitude of the insulation resistance is equal to or greater than the second resistance value, upon determining that the magnitude of the insulation resistance is less than the second resistance value, determining that the insulation resistance is abnormal.

The method may further include, after determining whether recovery control is necessary, upon determining that recovery control is not necessary, controlling a control valve and a circulation pump so as to control the flow of the coolant between a bypass line, bypassing a radiator located between the circulation pump and the fuel cell stack in the coolant line and merging with the coolant line, and the coolant line based on the temperature of the coolant or the temperature of the fuel cell stack.

In accordance with a further aspect of the present disclosure, a non-transitory computer readable medium containing program instructions executed by a processor can include: program instructions that measure an insulation resistance of a high-voltage terminal connected to a fuel cell stack; program instructions that determine whether recovery control is necessary based on the measured insulation resistance; and upon determining that recovery control is necessary, program instructions that change a flow of coolant passing through a deionizer for removing impurities or ions from the coolant in a coolant line for cooling the fuel cell stack.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
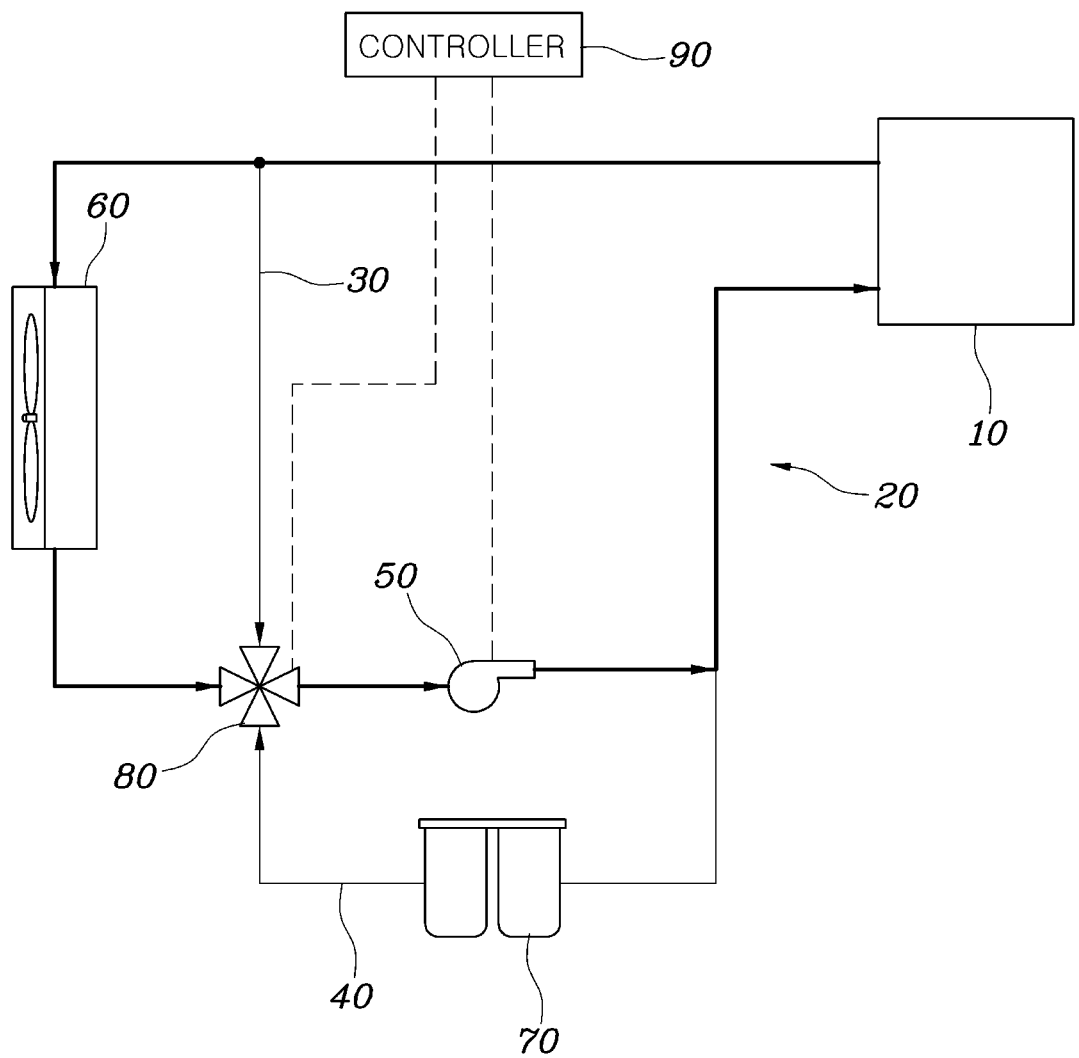
FIG. 1 is a schematic view showing the constitution of an insulation resistance maintenance system of a fuel cell according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "er", "or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Various exemplary embodiments will now be described more fully with reference to the accompanying drawings, in which only some exemplary embodiments are shown. Specific structural and functional details disclosed herein are merely representative for the purpose of describing exemplary embodiments. The present disclosure, however, may be embodied in many alternate forms and should not be construed as being limited only to the exemplary embodiments set forth herein.

Accordingly, while exemplary embodiments of the disclosure are capable of being variously modified and taking alternative forms, embodiments thereof are shown by way of example in the drawings and will herein be described in detail. It should be understood, however, that there is no intent to limit the present disclosure to the particular exemplary embodiments disclosed. On the contrary, exemplary embodiments are to cover all modifications, equivalents, and alternatives falling within the scope of the disclosure.

It will be understood that, although the terms "first", "second", etc. may be used herein to describe various elements, these elements should not be limited by these terms. These terms are only used to distinguish one element from another. For example, a first element could be termed a second element, and similarly, a second element could be termed a first element, without departing from the scope of exemplary embodiments of the present disclosure.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent" etc.).

Reference will now be made in detail to the preferred embodiments of the present disclosure, examples of which are illustrated in the accompanying drawings. Wherever possible, the same reference numbers will be used throughout the drawings to refer to the same or like parts.

FIG. 1 is a schematic view showing the constitution of an insulation resistance maintenance system of a fuel cell according to an embodiment of the present disclosure.

Referring to FIG. 1, an insulation resistance maintenance system of a fuel cell according to an embodiment of the present disclosure includes a fuel cell stack 10, a coolant line 20 formed so as to allow coolant flowing therethrough to pass through the fuel cell stack 10, a circulation pump 50 provided in the coolant line 20 in order to circulate the coolant in the coolant line 20, a deionizer 70 provided in the coolant line 20 in order to remove impurities or ions contained in the coolant in the coolant line 20, and a controller 90 configured to measure the insulation resistance of a high-voltage terminal connected to the fuel cell stack 10, to determine whether recovery control is necessary based on the measured insulation resistance, and upon determining that recovery control is necessary, to control the circulation pump 50 so as to change the flow of the coolant passing through the deionizer 70.

The fuel cell stack 10 is a device that receives hydrogen and oxygen and generates electric energy through chemical reactions. Heat is generated by the reaction of hydrogen and oxygen, and a cooling device is required to remove the heat.

The cooling device for cooling the fuel cell stack 10 may be of various cooling types, such as a water-cooling type, an air-cooling type, and the like. Here, the water-cooling type using water as a coolant will be described by way of example.

The coolant line 20 is formed such that coolant flows therethrough and such that the coolant flowing therethrough passes through the fuel cell stack 10. The circulation pump 50 is included in the coolant line 20 in order to circulate the coolant in the coolant line 20. The circulation pump 50 serves to pump the coolant to circulate along the coolant line 20 so as to continuously cool the fuel cell stack 10. The coolant line 20 is indicated by the thick line in FIG. 1.

The deionizer 70 is a device that removes impurities or ions from the coolant in the coolant line 20. The deionizer 70 may be an ion filter. When the coolant passes through the deionizer 70, impurities or ions may be removed therefrom.

The controller 90 may measure the insulation resistance of the high-voltage terminal connected to the fuel cell stack 10. The fuel cell stack 10 may be connected to a high-voltage battery and a motor via the high-voltage terminal. The insulation resistance may be measured by measuring the voltage at which the fuel cell stack 10 is connected to the high-voltage terminal. For example, the internal circuit included in a stack voltage monitor (SVM) may measure the insulation resistance based on the fuel cell voltage using a resistive voltage division measurement method.

The controller 90 may determine whether recovery control is necessary based on the measured insulation resistance. Upon determining that recovery control is necessary, the controller 90 may control the circulation pump 50 so as to change the flow of the coolant passing through the deionizer 70. Specifically, the circulation pump 50 may be controlled such that the flow rate of the coolant passing through the deionizer 70 is increased.

In a fuel cell vehicle, when the insulation resistance decreases to a predetermined reference value or lower, the controller 90 may perform control such that a warning light is turned on, such that a diagnostic trouble code (DTC) is generated, and such that the output of the vehicle is restricted and restart is not permitted after shutdown. Specifically, when the state in which the insulation resistance decreases to a predetermined reference value or lower is maintained for a predetermined time period or longer or when the insulation resistance decreases to a predetermined reference value or lower a predetermined number of times or more, it may be determined that the insulation resistance is abnormal.

In many cases, the insulation resistance may temporarily decrease due to contamination of the coolant for cooling the fuel cell stack 10. However, even when the insulation resistance temporarily decreases for this reason, there may occur situations in which the vehicle needs to be towed or consumable elements, such as coolant, an ion filter, and the like, need to be replaced, and many consumers have complaints about the requirement to take such measures.

However, according to the insulation resistance maintenance system of a fuel cell according to the present disclosure, it is possible to prevent a temporary decrease in insulation resistance due to contamination of the coolant in the fuel cell stack 10. That is, the insulation resistance of the fuel cell is maintained high so as to prevent a decrease in insulation resistance and consequently to prevent the controller from determining that the insulation resistance is abnormal. Accordingly, it is possible to reduce unnecessary maintenance or emergency control of parts.

The insulation resistance maintenance system of a fuel cell according to the present disclosure may further include a radiator 60 located between the circulation pump 50 and the fuel cell stack 10 in the coolant line 20 in order to cool the coolant in the coolant line 20, a bypass line 30 diverging from a point of the coolant line 20 before the coolant enters the radiator 60 based on the flow direction of the coolant and merging with the coolant line 20 while bypassing the radiator 60, and a control valve 80 located at the point at which the bypass line 30 diverges from the coolant line 20 or a point at which the bypass line 30 merges with the coolant line 20 in order to control the flow of the coolant between the coolant line 20 and the bypass line 30.

The radiator 60 is located between the circulation pump 50 and the fuel cell stack 10 in the coolant line 20. Particularly, the radiator 60 may be located at a point through which the coolant flows back to the circulation pump 50 from the fuel cell stack 10 based on the flow direction of the coolant.

The radiator 60 is provided to cool the coolant heated by the fuel cell stack 10. The radiator 60 may cool the coolant flowing therethrough through heat exchange between external gas and the coolant.

The bypass line 30 is a line through which the coolant flowing through the coolant line 20 bypasses the radiator 60. That is, the bypass line 30 directly connects a point of the coolant line 20 before the radiator 60 to a point of the coolant line 20 after the radiator 60. The controller 90 may control the amount of cooling performed by the radiator 60 by controlling the flow rate of the coolant flowing through the coolant line 20 and the bypass line 30 in order to maintain the temperature of the coolant at an appropriate level.

The control valve 80 may be located at the point at which the bypass line 30 diverges from the coolant line 20 or the point at which the bypass line 30 merges with the coolant line 20. The control valve 80 serves to control the flow of the coolant between the coolant line 20 and the bypass line 30 at the diverging point or the merging point of the bypass line 30 and the coolant line 20.

The controller 90 may control the control valve 80 so as to change the flow of the coolant between the coolant line 20 and the bypass line 30 based on the temperature of the coolant or the temperature of the fuel cell stack 10. The temperature of the fuel cell stack 10 may generally be estimated by measuring the temperature of the coolant. Accordingly, in order to control the amount of cooling of the coolant according to the temperature of the coolant, the control valve 80 may be controlled to change the flow of the coolant between the coolant line 20 and the bypass line 30 based on the temperature of the coolant or the temperature of the fuel cell stack 10.

Therefore, when recovery control is not necessary, the control valve 80 and the circulation pump 50 may be controlled to control the amount of cooling performed by the radiator 60 so that the temperature of the coolant in the coolant line 20 is maintained at an appropriate level. As a result, the coolant in the coolant line 20 may be maintained at an appropriate temperature.

The control valve 80 may be a 4-way valve, which is connected with the coolant line 20, the bypass line 30 and a filter line 40. Specifically, the control valve 80 may be located at the position at which the bypass line 30 merges with the coolant line 20 so that the coolant having passed through the radiator 60 and the coolant flowing through the bypass line 30 are introduced thereinto. In addition, the filter line 40, which diverges from a point of the coolant line 20 between the circulation pump 50 and the fuel cell stack 10, may be connected to the control valve 80 so that the coolant having passed through the deionizer 70 is introduced into the control valve 80.

The 4-way control valve 80 may receive the coolant through three ports thereof and may discharge the coolant through the remaining one port thereof so that the coolant is supplied to the circulation pump 50 along the coolant line 20. The controller 90 may control the control valve 80 to control the flow rate of the coolant flowing through the coolant line 20, the bypass line 30 and the filter line 40.

That is, the controller 90 may control the flow rate of the coolant flowing through the coolant line 20, the bypass line 30 and the filter line 40 merely by controlling a single control valve 80, thereby achieving coolant temperature maintenance and ion removal.

In particular, when recovery control is necessary, the controller 90 may control the control valve 80 to increase the flow rate of the coolant in the filter line 40. That is, a greater amount of impurities may be removed from the coolant by the deionizer 70 by controlling the control valve 80 so as to increase the flow rate of the coolant flowing to the filter line 40. As a result, a greater amount of ions is removed from the coolant, and accordingly the insulation resistance may be restored quickly.

Figure 2:
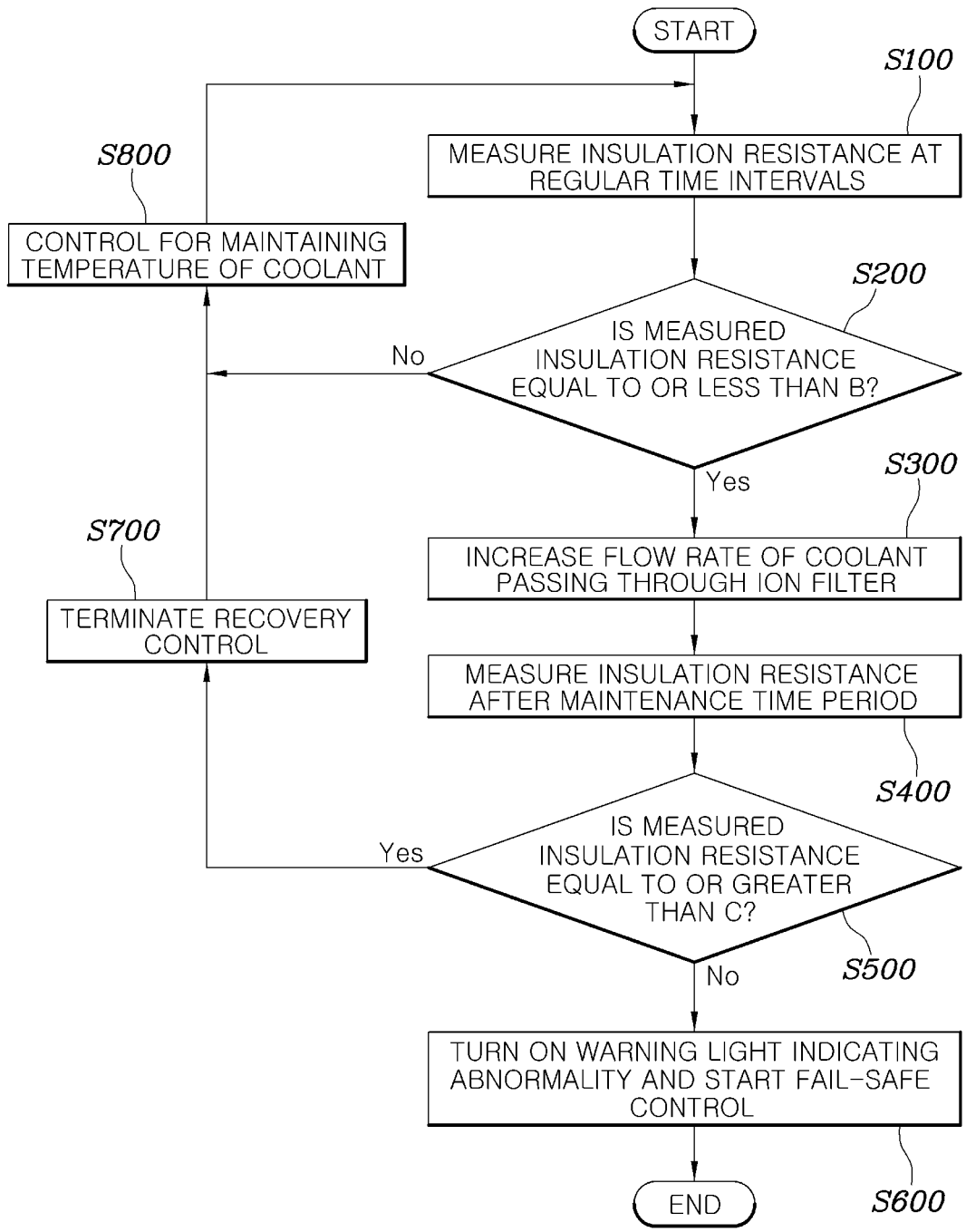
FIG. 2 is a flowchart showing an insulation resistance maintenance method of a fuel cell according to an embodiment of the present disclosure.

FIG. 2 is a flowchart showing an insulation resistance maintenance method of a fuel cell according to an embodiment of the present disclosure.

Referring to FIG. 2, the insulation resistance maintenance method of a fuel cell according to an embodiment of the present disclosure includes the steps of measuring the insulation resistance of a high-voltage terminal connected to the fuel cell stack 10 (S100), determining whether recovery control is necessary based on the measured insulation resistance (S200), and upon determining that recovery control is necessary, changing the flow of the coolant passing through the deionizer 70 that removes impurities or ions from the coolant in the coolant line 20 for cooling the fuel cell stack 10 (S300).

Figure 4:
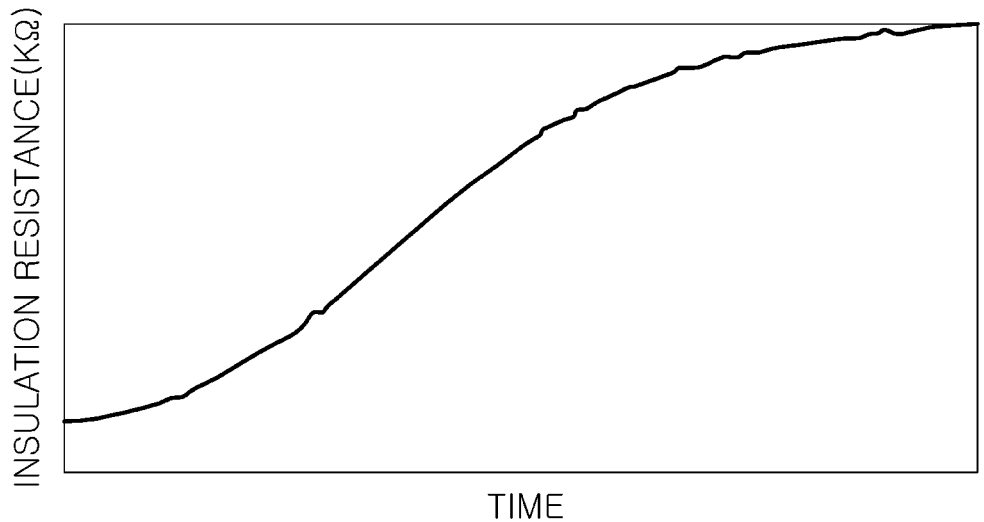
FIG. 4 is a graph showing variation in insulation resistance of a fuel cell depending on recovery control according to an embodiment of the present disclosure.

FIG. 4 is a graph showing variation in insulation resistance of a fuel cell depending on recovery control according to an embodiment of the present disclosure.

Referring to FIG. 4, when recovery control for restoring the insulation resistance of the fuel cell is performed, it can be seen that the insulation resistance of the fuel cell is rapidly restored over time. That is, when the insulation resistance is temporarily reduced due to contamination of the coolant, the insulation resistance is restored by removing a greater amount of ions using the deionizer 70.

Specifically, in the step (S100) of measuring the insulation resistance of the high-voltage terminal, the insulation resistance of the high-voltage terminal may be measured at predetermined regular time intervals. That is, the insulation resistance may be continuously monitored by measuring the insulation resistance of the high-voltage terminal at predetermined regular time intervals.

In the step (S200) of determining whether recovery control is necessary, it may be determined whether recovery control is necessary based on the measured magnitude of the insulation resistance. Specifically, when the measured magnitude of the insulation resistance is equal to or less than a predetermined first resistance value B, it may be determined that recovery control is necessary.

Figure 3:
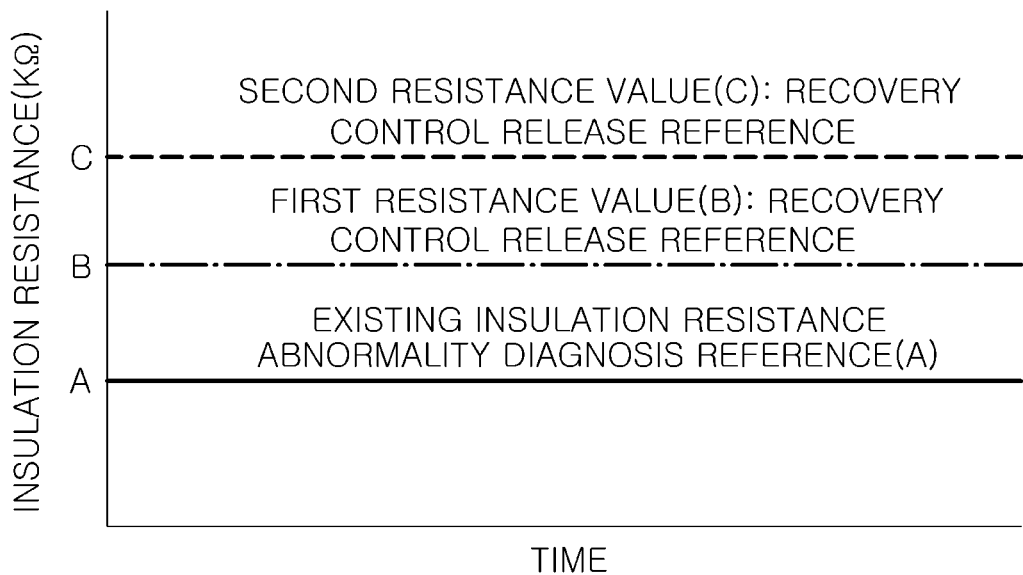
FIG. 3 is a graph showing the reference values of insulation resistance of a fuel cell according to an embodiment of the present disclosure.

FIG. 3 is a graph showing the reference values of the insulation resistance of a fuel cell according to an embodiment of the present disclosure.

Referring to FIG. 3, as a condition under which recovery control for restoring the insulation resistance is started, it is determined whether the magnitude of the insulation resistance has decreased to the first resistance value B or lower. The first resistance value B may be set to be greater than the existing insulation resistance abnormality diagnosis reference value A. Accordingly, it is possible to determine whether the insulation resistance can be restored prior to determining that the insulation resistance is abnormal, and control may be performed so that the insulation resistance is restored.

In the step (S300) of changing the flow of the coolant, when recovery control is necessary, the flow rate of the coolant, which passes through the deionizer 70 that removes impurities or ions from the coolant in the coolant line 20 for cooling the fuel cell stack 10, may be changed. In particular, the flow rate of the coolant passing through the deionizer 70 may be changed so as to be increased.

Specifically, the circulation pump 50 for circulating the coolant in the coolant line 20 may be controlled at a predetermined number of revolutions per minute (RPM).

The predetermined RPM may be set to be higher than the normal driving RPM of the circulation pump 50 so that the flow rate of the coolant pumped by the circulation pump 50 is increased. Accordingly, the flow rate of the coolant passing through the deionizer 70 may be increased.

It is also possible to control the control valve 80 so as to increase the flow rate of the coolant passing through the deionizer 70 located in the filter line 40, which diverges from a point of the coolant line 20 between the circulation pump 50 and the fuel cell stack 10 and merges with a point of the coolant line 20 before the circulation pump 50 via the control valve 80. That is, it is possible to control the control valve 80 so that the coolant flows to the filter line 40 in which the deionizer 70 is located.

In the step (S300) of changing the flow of the coolant, the change of the flow of the coolant may be maintained for a predetermined maintenance time period. The insulation resistance maintenance method of a fuel cell according to the embodiment of the present disclosure may further include the steps of determining whether the magnitude of the insulation resistance measured after the predetermined maintenance time period is equal to or greater than a predetermined second resistance value C, which is greater than the first resistance value (S500), and upon determining that the magnitude of the insulation resistance is equal to or greater than the second resistance value C, terminating recovery control for changing the flow of the coolant (S700).

Recovery control may be maintained for a predetermined maintenance time period. It may be determined whether the insulation resistance has increased by measuring the insulation resistance again after the predetermined maintenance time period (S400). Specifically, it may be determined whether the insulation resistance is equal to or greater than the second resistance value C, which is set to be greater than the first resistance value.

Upon determining that the insulation resistance has increased, it may be determined that ions have been removed from the coolant by the deionizer 70 and that recovery control has been successfully performed. That is, when the magnitude of the insulation resistance is equal to or greater than the second resistance value C, recovery control for changing the flow of the coolant may be terminated (S700). As shown in FIG. 3, the second resistance value C, which is greater than the first resistance value B, may be a condition for terminating recovery control.

The insulation resistance maintenance method of a fuel cell according to the embodiment of the present disclosure may further include, after the step (S500) of determining whether the magnitude of the insulation resistance is equal to or greater than the second resistance value C, upon determining that the magnitude of the insulation resistance is less than the second resistance value C, determining that the insulation resistance is abnormal (S600).

That is, when the insulation resistance is not changed or decreases even after recovery control is performed, it may be determined that the abnormality of the insulation resistance is not merely due to ions or impurities contained in the coolant. Alternatively, it may be determined that the deionizer 70 has failed or that the coolant needs to be replaced.

In addition, when the insulation resistance is not increased even after recovery control is performed for the predetermined maintenance time period, recovery control may be performed once again for the predetermined maintenance time period. The reason for performing recovery control once again is to increase the accuracy of determination because the predetermined maintenance time period may not be sufficient, or the above problem may be temporary.

In the step (S600) of determining that the insulation resistance is abnormal, after the step (S500) of determining whether the magnitude of the insulation resistance is equal to or greater than the second resistance value C, it may be determined that the insulation resistance is abnormal when the magnitude of the insulation resistance is less than the second resistance value C. In another embodiment, it may be determined that the insulation resistance is abnormal when the insulation resistance decreases to the existing abnormality diagnosis reference value.

In the step (S600) of determining that the insulation resistance is abnormal, control may be performed such that a warning light of the fuel cell vehicle is turned on and such that a diagnostic trouble code (DTC) is generated in order to make the user aware of the necessity to perform maintenance on the vehicle. In addition, the fuel cell vehicle may be controlled so as to be driven in a fail-safe mode.

Specifically, when the fuel cell vehicle is driven in a fail-safe mode, control may be performed such that the voltage of the fuel cell stack 10 is maintained at a predetermined safety voltage or lower. Alternatively, control may be performed such that the output of the fuel cell stack 10 is restricted to a predetermined limit value. In a more dangerous situation, control may be performed such that the vehicle is forcibly shut down and such that restart is impossible after the shutdown.

The insulation resistance maintenance method of a fuel cell according to the embodiment of the present disclosure may further include, after the step (S200) of determining whether recovery control is necessary, upon determining that recovery control is not necessary, controlling the control valve 80 and the circulation pump 50 so as to control the flow of the coolant between the bypass line 30, which bypasses the radiator 60 located between the circulation pump 50 and the fuel cell stack 10 in the coolant line 20 and merges with the coolant line 20, and the coolant line 20 based on the temperature of the coolant or the temperature of the fuel cell stack 10 (S800).

That is, when the insulation resistance is maintained sufficiently high and thus recovery control is not necessary, the necessity to remove ions from the coolant may be low. Thus, the need to maintain an appropriate temperature of the coolant for cooling the fuel cell stack 10 may be increased. Therefore, the flow of the coolant between the bypass line 30 and the coolant line 20 may be controlled based on the temperature of the fuel cell stack 10 or the temperature of the coolant.

Accordingly, the temperature of the fuel cell stack 10 may be appropriately maintained, with the result that the power generation efficiency of the fuel cell stack 10 may be increased, and the fuel efficiency of the vehicle may be improved.

FIG. 4 is a graph showing variation in insulation resistance of a fuel cell depending on recovery control according to an embodiment of the present disclosure.

Referring to FIG. 4, according to recovery control in accordance with the embodiment of the present disclosure, the insulation resistance of the fuel cell, which has decreased due to a temporary increase in impurities or ions in the coolant, may be increased as recovery control is performed for a predetermined time period.

However, unlike FIG. 4, when insulation resistance is not changed or decreases even after recovery control according to the embodiment of the present disclosure is performed, it may be determined that the abnormality of the insulation resistance occurs due to other causes, for example, the case in which the deionizer malfunctions and thus needs to be replaced, the case in which the coolant needs to be replaced, or the case in which parts other than the coolant fail to function normally.

As is apparent from the above description, the present disclosure provides a system and method for maintaining insulation resistance of a fuel cell, which may prevent a reduction in insulation resistance attributable to contamination of coolant of a fuel cell stack.

In addition, it is possible to prevent inconvenience caused by emergency control, such as limited fuel cell output, impossibility of restart, or the like, which is due to a reduction in insulation resistance attributable to contamination of coolant.

In addition, it is possible to analyze the cause of reduced insulation resistance, thus enabling a user to determine the need to replace coolant or an ion filter.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A method of maintaining an insulation resistance of a fuel cell, the method comprising:
   measuring, by a controller, the insulation resistance of a high-voltage terminal connected to a fuel cell stack;
   determining, by the controller, whether recovery control for restoring the insulation resistance is necessary based on the measured insulation resistance; and
   upon determining that recovery control is necessary, changing a flow of coolant passing through a deionizer for removing impurities or ions from the coolant in a coolant line for cooling the fuel cell stack,
   wherein in determining whether recovery control is necessary, when a magnitude of the measured insulation resistance is equal to or less than a predetermined first resistance value, it is determined that recovery control is necessary, and
   wherein the predetermined first resistance value is set to be greater than an existing insulation resistance abnormality diagnosis reference value.

2. The method according to claim 1, wherein in changing the flow of the coolant, a circulation pump for circulating the coolant in the coolant line is controlled at a predetermined number of revolutions per minute (RPM), and a control valve is controlled so as to increase a flow rate of the coolant passing through the deionizer located in a filter line, the filter line diverging from a point of the coolant line between the circulation pump and the fuel cell stack and merging with a point of the coolant line before the circulation pump via the control valve.

3. The method according to claim 1, wherein in measuring the insulation resistance of the high-voltage terminal, the insulation resistance of the high-voltage terminal is measured at predetermined regular time intervals.

4. The method according to claim 1, wherein in changing the flow of the coolant, a change of a flow of the coolant is maintained for a predetermined maintenance time period, and
   wherein the method further comprises:
   determining whether a magnitude of the insulation resistance measured after the predetermined maintenance time period is equal to or greater than a predetermined second resistance value that is greater than the first resistance value; and
   upon determining that the magnitude of the insulation resistance is equal to or greater than the second resistance value, terminating recovery control for changing the flow of the coolant.

5. The method according to claim 4, further comprising: after determining whether the magnitude of the insulation resistance is equal to or greater than the second resistance value,
   upon determining that the magnitude of the insulation resistance is less than the second resistance value, determining that the insulation resistance is abnormal.

6. The method according to claim 1, further comprising: after determining whether recovery control is necessary,
   upon determining that recovery control is not necessary, controlling a control valve and a circulation pump so as to control a flow of the coolant between a bypass line, bypassing a radiator located between the circulation pump and the fuel cell stack in the coolant line and merging with the coolant line, and the coolant line based on a temperature of the coolant or a temperature of the fuel cell stack.

* * * * *